US012692125B2

(12) United States Patent
Gireddy et al.

(10) Patent No.: US 12,692,125 B2
(45) Date of Patent: Jul. 28, 2026

(54) SYSTEMS AND METHOD FOR DETECTING A LOCATION OF A PERSON IN A HOISTWAY

(71) Applicant: OTIS ELEVATOR COMPANY, Farmington, CT (US)

(72) Inventors: Jayapal Reddy Gireddy, Hyderabad (IN); Helge Krambeck, Berlin (DE); Xinjin Zheng, Hangzhou (CN); Yuzhen Xue, Novi, MI (US); Koji Kiyomoto, Tomisato (JP); Arnaud Blanchard, Adon (FR); Daigoro Kurokawa, Sakura (JP); Kazuya Yamamura, Tomisato (JP); Hideki Arai, Shisui-machi (JP); Terumitsu Saito, Chiba (JP); Hideaki Sasaki, Funabashi (JP); Takashi Tanaka, Narita (JP); Naoto Furuichi, Narita (JP)

(73) Assignee: OTIS ELEVATOR COMPANY, Farmington, CT (US)

( * ) Notice: Subject to any disclaimer, the term of this patent is extended or adjusted under 35 U.S.C. 154(b) by 953 days.

(21) Appl. No.: 17/952,872

(22) Filed: Sep. 26, 2022

(65) Prior Publication Data

US 2024/0101391 A1 Mar. 28, 2024

(51) Int. Cl.

*B66B 5/00* (2006.01)
*B66B 1/34* (2006.01)
*B66B 3/00* (2006.01)

(52) U.S. Cl.

CPC .......... *B66B 5/0062* (2013.01); *B66B 1/3461* (2013.01); *B66B 1/3492* (2013.01); *B66B 3/002* (2013.01); *B66B 5/0012* (2013.01)

(58) Field of Classification Search

CPC ..... B66B 5/005; B66B 5/0012; B66B 5/0062; B66B 1/3461; B66B 1/3492

See application file for complete search history.

(56) References Cited

U.S. PATENT DOCUMENTS 3,792,759 A * 2/1974 Kirsch .................... B66B 5/022 187/278
8,061,486 B2 * 11/2011 Monzon .................. B66B 5/005 340/541

(Continued)

FOREIGN PATENT DOCUMENTS

EP 3354612 A1 1/2018
EP 3459894 A1 3/2019

(Continued)

OTHER PUBLICATIONS

Extended European Search Report issued in EP22212064.4, dated Aug. 11, 2023.

*Primary Examiner* — Rina I Duda

(74) *Attorney, Agent, or Firm* — CANTOR COLBURN LLP

(57) ABSTRACT

A system for detecting a presence of a person in a hoistway, having: one or more controllers configured to authenticate the person in the hoistway; the one or more controllers being operationally connected to an elevator car in the hoistway and configured to determine whether the person is within a predetermined distance of the elevator car from a signal emitter on the person; wherein when the person is within the predetermined distance of the elevator car, the one or more controllers is configured to transmit a feedback request to the person and stop the elevator car unless the one or more controllers receives feedback to the feedback request within a predetermined period of time.

19 Claims, 13 Drawing Sheets

(56) References Cited

U.S. PATENT DOCUMENTS

| | | | | |
|---|---|---|---|---|
| 9,272,878 | B2 * | 3/2016 | Kocher | B66B 5/005 |
| 9,359,171 | B1 * | 6/2016 | Nowel | A42B 3/0453 |
| 10,526,168 | B2 * | 1/2020 | Litteral | B66B 5/0031 |
| 10,741,049 | B2 * | 8/2020 | Kato | B66B 5/0087 |
| 10,906,776 | B2 * | 2/2021 | Nanjappan | B66B 5/0056 |
| 10,947,087 | B2 * | 3/2021 | Herkel | B66B 1/36 |
| 2018/0134518 | A1 * | 5/2018 | Fauconnet | B66B 5/288 |
| 2019/0084796 | A1 * | 3/2019 | Buckley | B66B 5/005 |
| 2020/0039784 | A1 * | 2/2020 | Oggianu | B66B 5/005 |

FOREIGN PATENT DOCUMENTS

| | | | |
|---|---|---|---|
| JP | 2015231893 | A | 12/2015 |
| WO | 2009073001 | A1 | 6/2009 |

* cited by examiner

SYSTEMS AND METHOD FOR DETECTING A LOCATION OF A PERSON IN A HOISTWAY

BACKGROUND

The embodiments relate to an elevator system and more specifically to systems and method for detecting a location of a person in a hoistway.

Safety of a mechanics in the field, in elevator systems, is a concern of the elevator industry. Though rules and protocols are in place to protect mechanics, there remain instances where mechanics may still become injured. That is, the elevator industry has robust safety protocols, rules, and administrative controls. These rules are not always followed, and the industry continues to experience accidents of service mechanics due to human error on the job. A service mechanic could be struck by moving elevator components, this includes being on top of the car and leaning outside of the car top perimeter, in the pit, in the hoistway, e.g., standing, for example on a spreader beam. There is a desire to provide a solution which assists in protecting the safety of mechanics in the field.

BRIEF SUMMARY

Disclosed is a system for detecting a presence of a person in a hoistway, including: one or more controllers configured to authenticate the person in the hoistway; the one or more controllers being operationally connected to an elevator car in the hoistway and configured to determine whether the person is within a predetermined distance of the elevator car from a signal emitter on the person; wherein when the person is within the predetermined distance of the elevator car, the one or more controllers is configured to transmit a feedback request to the person and stop the elevator car unless the one or more controllers receives feedback to the feedback request within a predetermined period of time.

In addition to one or more aspects of the system, or as an alternate, the signal emitter is a smart helmet that is configured for being worn by the person and which is configured to communicate with the one or more controllers, whereby the one or more controllers is configured to determine whether the person is within the predetermined distance of the elevator car.

In addition to one or more aspects of the system, or as an alternate, the one or more controllers is configured to transmit to a mobile phone of the person the feedback request.

In addition to one or more aspects of the system, or as an alternate, the one or more controllers includes: an elevator controller that controls directional motion of the elevator car; and a beacon connected to the elevator car that is configured to communicate with the smart helmet to determine a proximity of the smart helmet to the elevator car, and to communicate with the mobile phone of the person to transmit the feedback request.

In addition to one or more aspects of the system, or as an alternate, the smart helmet is configured to communicate with the beacon utilizing Bluetooth Low Energy.

In addition to one or more aspects of the system, or as an alternate, the signal emitter transmits a signal that is uniquely assigned to the helmet of the person.

Disclosed is another system for detecting motion of an elevator car, including: a first transmitter that is located on the elevator car; a second transmitter that is configured to be worn by a person; wherein the first and second transmitters are operatively coupled over a wireless communication path; wherein the first transmitter is configured to determine when a velocity or acceleration change occurs in the elevator car and transmit a signal indicative of the velocity or acceleration change to the second transmitter; and the second transmitter is configured to provide a warning to the person when the velocity or acceleration change is greater than a threshold.

In addition to one or more aspects of the another system, or as an alternate, the signal emitter is a smart key.

In addition to one or more aspects of the another system, or as an alternate, the another system includes a plurality of signal detectors located in one or more of the hoistway and the elevator car and are operatively coupled to the one or more controllers, whereby the one or more controllers are configured to determine that the person is located within the elevator car, above the elevator car, or in a hoistway pit.

In addition to one or more aspects of the another system, or as an alternate, the another system includes signal detectors at a top of the hoistway, directly above the elevator car, within the elevator car, directly below the elevator car, and/or within the hoistway pit.

Further disclosed is a method of detecting a presence of a person in a hoistway, including: detecting when the person is within a predetermined distance from an elevator car in the hoistway via a signal emitter worn by the person; sending a feedback request to the person upon detecting the person is within the predetermined distance; and stopping the elevator car after failing to receive feedback within a predetermined period of time.

In addition to one or more aspects of the method system, or as an alternate, the method includes sending the feedback request to a mobile phone of the person.

In addition to one or more aspects of the method system, or as an alternate, the method includes authenticating the person via a smart helmet that is configured to be worn by the person, and which includes the signal emitter, and thereafter detecting when the person is within the predetermined distance from the elevator car in the hoistway.

In addition to one or more aspects of the method system, or as an alternate, the smart helmet transmits signals utilizing Bluetooth Low Energy.

In addition to one or more aspects of the method system, or as an alternate, one or more controllers is connected to the elevator car that communicates with the smart helmet utilizing Bluetooth Low Energy.

In addition to one or more aspects of the method system, or as an alternate, the signal emitter emits a unique signal assigned to the helmet of the person.

In addition to one or more aspects of the method system, or as an alternate, the method includes training the one or more controllers to learn via machine learning to determine when the person is within the hoistway.

In addition to one or more aspects of the method system, or as an alternate, the method includes communicating by the one or more controllers with one or more sensors to determine whether the one or more sensors detects a signal from the signal emitter, to thereby determine the person is within the hoistway or the elevator car.

In addition to one or more aspects of the method system, or as an alternate, the one or more sensors is located at a top of the hoistway, in a hoistway pit, directly above the elevator car, directly below the elevator car, and/or within the elevator car.

In addition to one or more aspects of the method system, or as an alternate, the signal emitter is a smart key.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
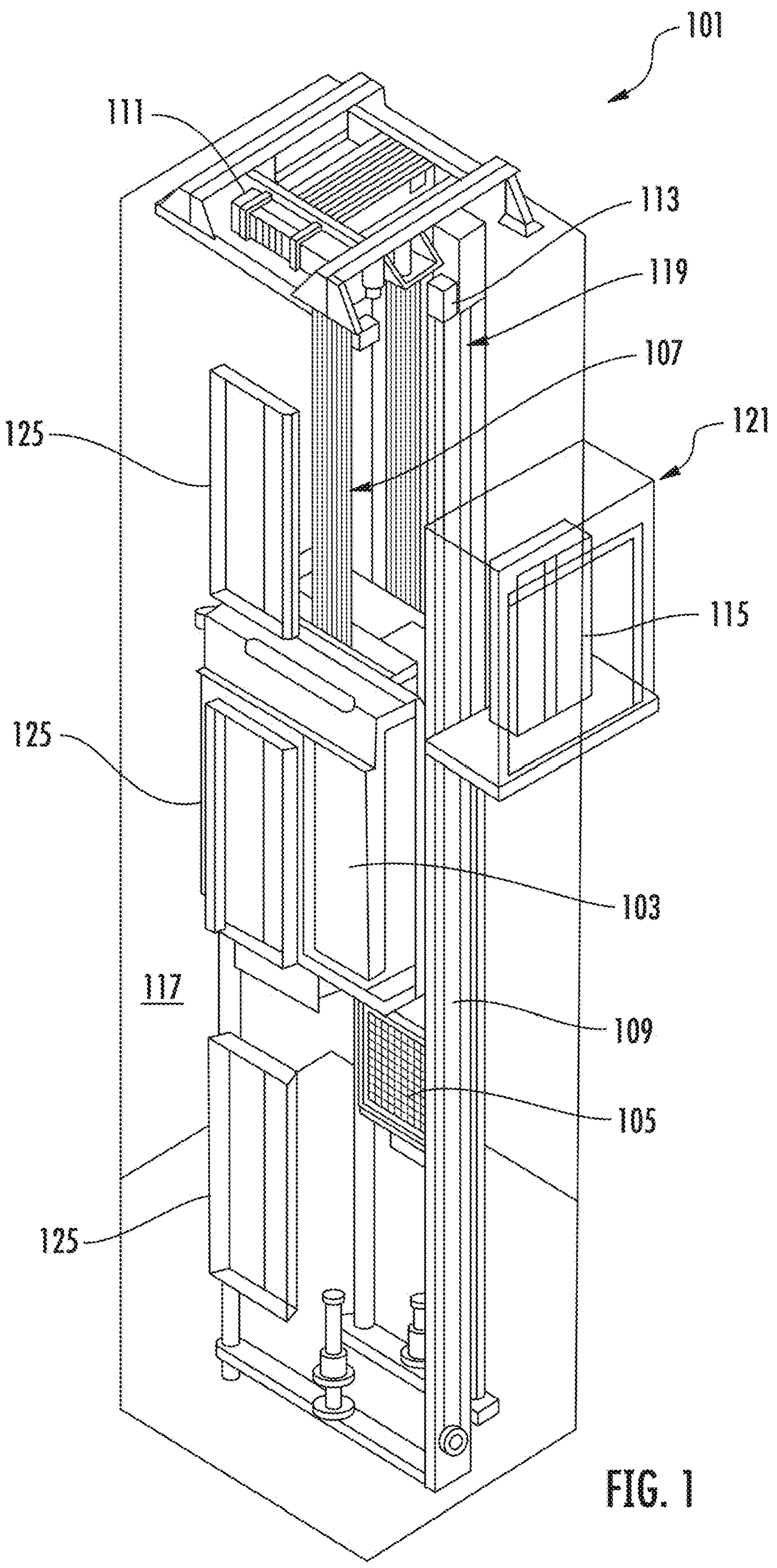
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail (or rail system) 109, a machine (or machine system) 111, a position reference system 113, and an electronic elevator controller (controller) 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car s103 concurrently and in an opposite direction with respect to the counterweight 105 within an elevator shaft (or hoistway) 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. Of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self-propelled elevator cars (e.g., elevator cars equipped with friction wheels, pinch wheels or traction wheels). FIG. 1 is merely a non-limiting example presented for illustrative and explanatory purposes.

Figure 2A:
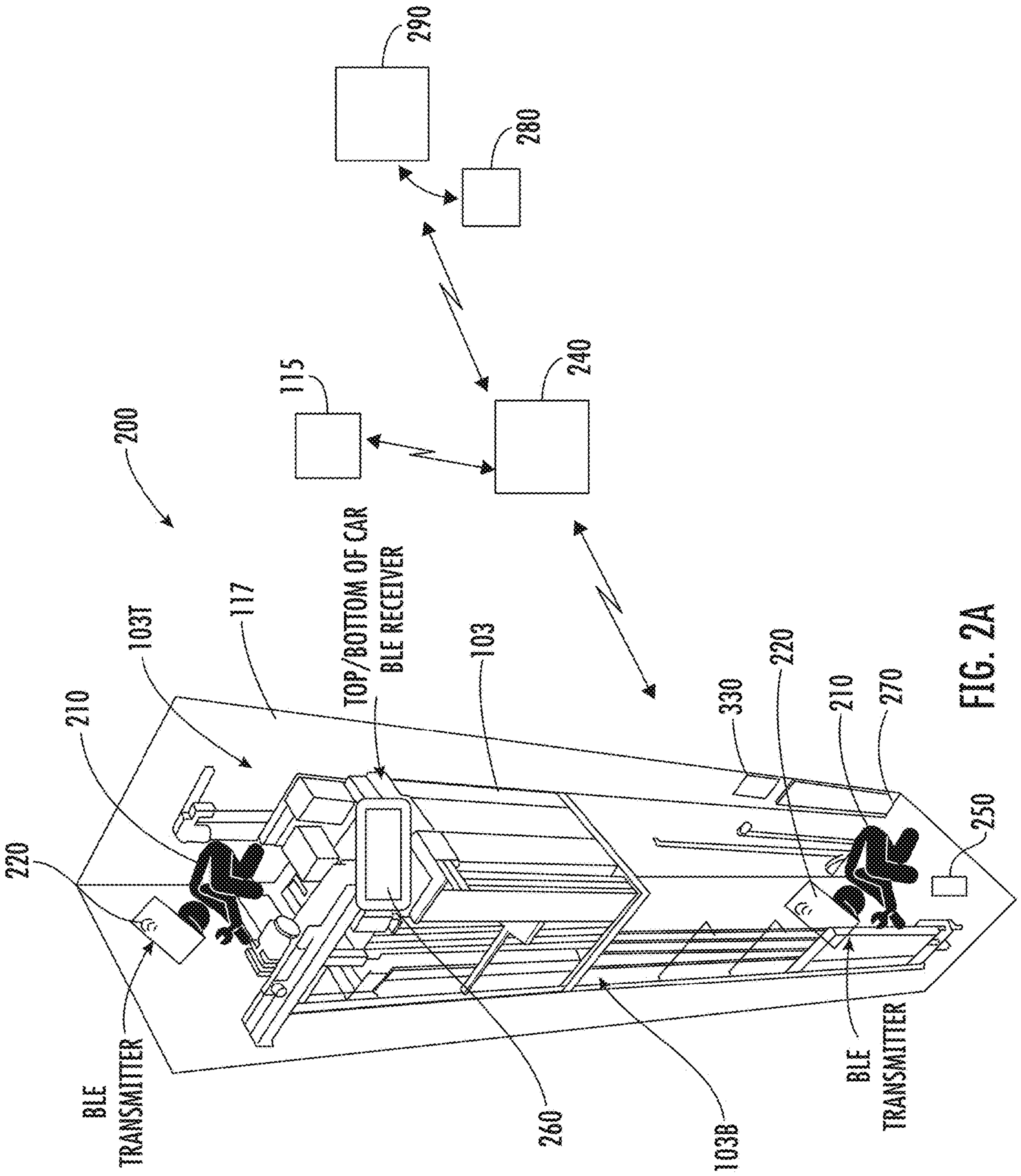
FIG. 2A shows the three zones of concern which are monitored once the mechanic is authenticated, the smart helmet is locked, and the elevator controller is in the in-service mode, according to an embodiment.
Figure 2B:
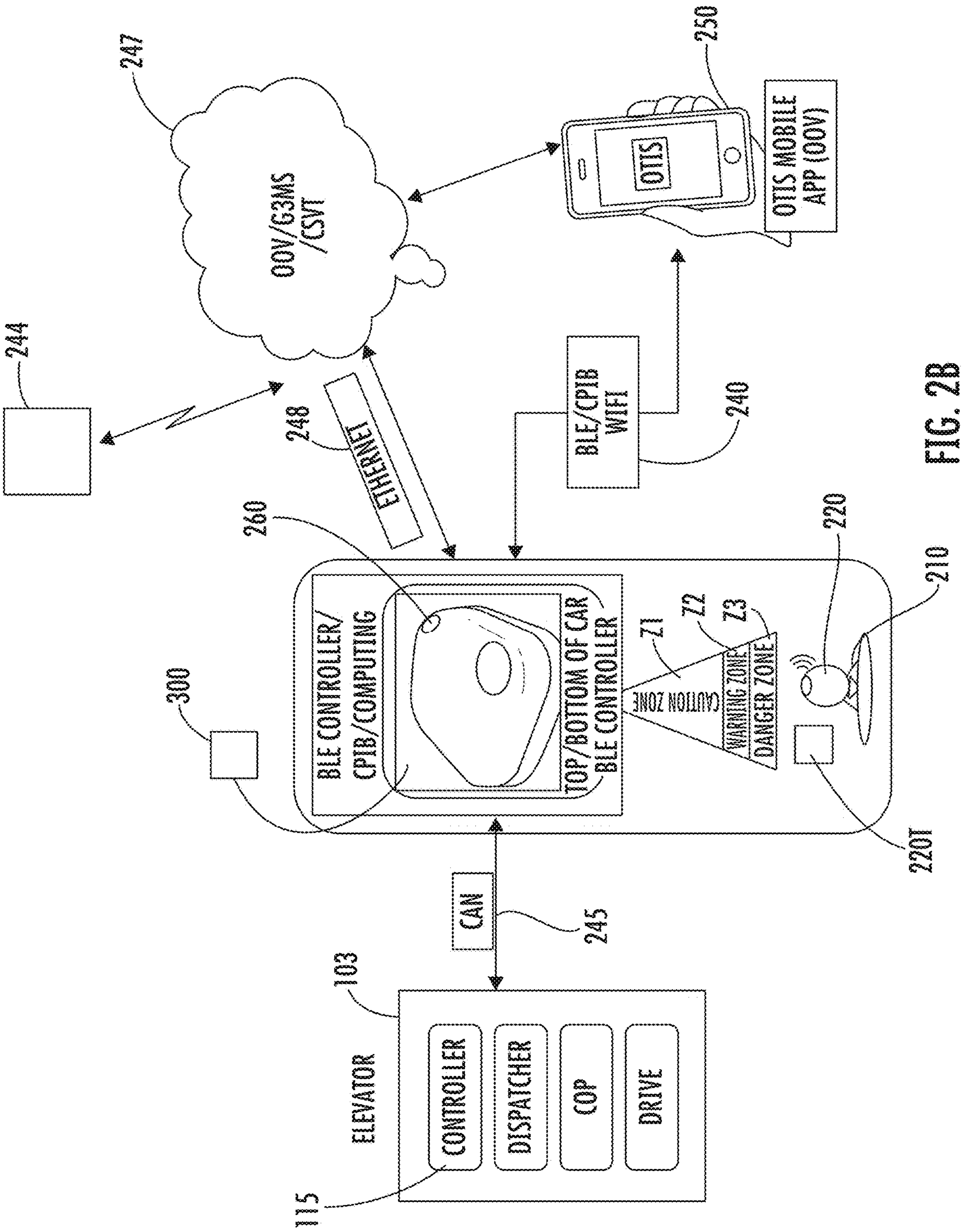
FIG. 2B shows communication paths and protocols executed when authenticating the mechanic, entering an in-service mode, and monitoring the three zones of concern.

Turning to FIGS. 2A and 2B, a system 200 is shown for detecting a location of a mechanic 210 in a hoistway 117. The system 200 includes beacon based smart helmet 220 (or helmet) as a signal emitter that is capable of having locking technology and linked pre-authentic system before service starts. This means that, before mechanic 210 starts service, he would be authenticated with a sensor 230 communicating with car controller 115 over a network 240. The sensor 230 would be one or more of an in-car, hallway, or mobile camera with the utilization of an app or COP based system, for example on a mobile device 250 of the mechanic 210, before moving elevator 103 into an in-service mode (e.g. relative to a normal run-mode) and sending a related notification, such as an alarm, to the elevator car controller 115. The authentication process includes wearing a smart helmet transmitter 220 and utilizing a pre-installed BLE receiver 260 (or beacon) on one or more of the top and bottom of the car 103. The BLE receiver 260 and elevator car controller 115 are otherwise collectively referred to as one or more controllers or processors. Depending on the signal strength, as the car 103 approaches mechanic 210, considering mechanic 210 height (position of mechanic 210 on the top of the car 103, in midway along the hoistway 117 or in the pit 270) from his available electronically stored profile 280 that the car controller 115 obtains via the network 240 from a system controller 290, and control one or more of the car 103 acceleration, deceleration, a breaking. The BLE receiver 260, having its own processing unit 300, can have three (3) zones of radiation Z1, Z2, Z3, including a caution zone Z1, a warning zone Z2, and a danger zone Z3. If setup is on top 103T of car 103, these zones Z1-Z3 are calculated considering car 103 height when travelling down direction in the hoistway 117 and vice versa in case setup is on the bottom 103B of the car 103 and the car 103 is travelling upwardly in the hoisway 117. The BLE service, the transmitter and receiver service, starts working as soon as elevator car 103, via the car controller 115, goes into an inspection (or in-service) mode from a normal operating mode.

FIG. 2A shows the three zones Z1-Z3 of concern which are monitored once the mechanic 210 is authenticated, the smart helmet 220 is locked, and the elevator controller 115 is in the in-service mode. FIG. 2B shows the communication paths and protocols executed when authenticating the mechanic 210, entering the in-service mode and monitoring the three zones Z1-Z3 of concern. Components of the embodiments include a smart helmet 220, e.g., with a BLE transmitter 220T. The helmet 220 can have a BLE transmitter 220T, a smart locking system (e.g., an authentication system that authenticates the mechanic before entering the in-service mode), and voice communication capabilities. For example, before starting the service, mechanic 210 would stand in front of in car camera 230 or would start a video app from a smart service mobile app on his mobile phone 150 for authentication purposes. This mode will be programed into the elevator system 200, e.g., the system controller 290 and/or the elevator controller 115, and authentication would be processed by the BLE controller 260, via edge computing, or via cloud service 244 or over a physical CAN elevator communications network 245 (each of which, along with the elevator controller 115, is collectively or alternatively a processor). If the inspection/in service mode is triggered, then the smart helmet locks in the in-service mode and starts the BLE transmitter 220T.

Regarding the BLE controller 260 and its processing unit 300, when the BLE controller 260 receives the inspection or in-service equivalent mode, the BLE controller 260 starts its reception capabilities and obtains the mechanic's profile 280 dynamically to compute the zone Z1-Z3 parameters in view of the pre-existing hoistway 117 dimensions and car 103 dimensions. The BLE controller 260 continuously monitors the mechanic's 210 transmitters' positions in the hoistway and sends the inputs to the controller to safeguard the mechanic 210. It cautions the mechanic 210 through voice communication (with a built-in speaker or via the mobile phone app) when the mechanic is in a caution zone Z1 and when the mechanic 210 is in a warning zone Z2 it asks the mechanic 210 for confirmation about his location. If the mechanic 210 does not give any confirmation within threshold time, then as soon as car 103 enters danger zone Z3, the BLE controller 260 sends the command to controller 115 via its emergency stop button or its equivalent and continues to hold the car 103 for next confirmation from the mechanic 210 via smart helmet 220 or mobile app.

When the mechanic 210 stops BLE on the helmet 220, which may communicate via G3MS protocols over a cellular network 247, and the connection may be via ethernet 248, it receives an alarm and the mechanic 210 has been questioned. So, this operation is allowed only when in required.

Regarding the controller 115 and dispatcher role in the disclosed embodiment, the elevator 103 and dispatcher can be less involved when an ESB (Emergency stop button) is triggered via the BLE controller 260 when the car 103 enters danger zone Z3 if any confirmation receives from the mechanic 210. Otherwise, the role of controller 115 and dispatcher and group dispatcher can be increased in case of an acceleration or deceleration when the elevator cars 103 are in common shared hoistways 117 without separators.

Regarding the mobile app (e.g., an OOV/SSVT app), the app is used for service thorough smart helmet authentication process and providing a command to the controller via zkip authentication remote SVT pass through. Regarding a line agent app (G3MS/OXP), this app tracked the service alarms and analyses and assists the mechanic 210 during service and after service depending on the collected data by linking to his profile.

Figure 2C:
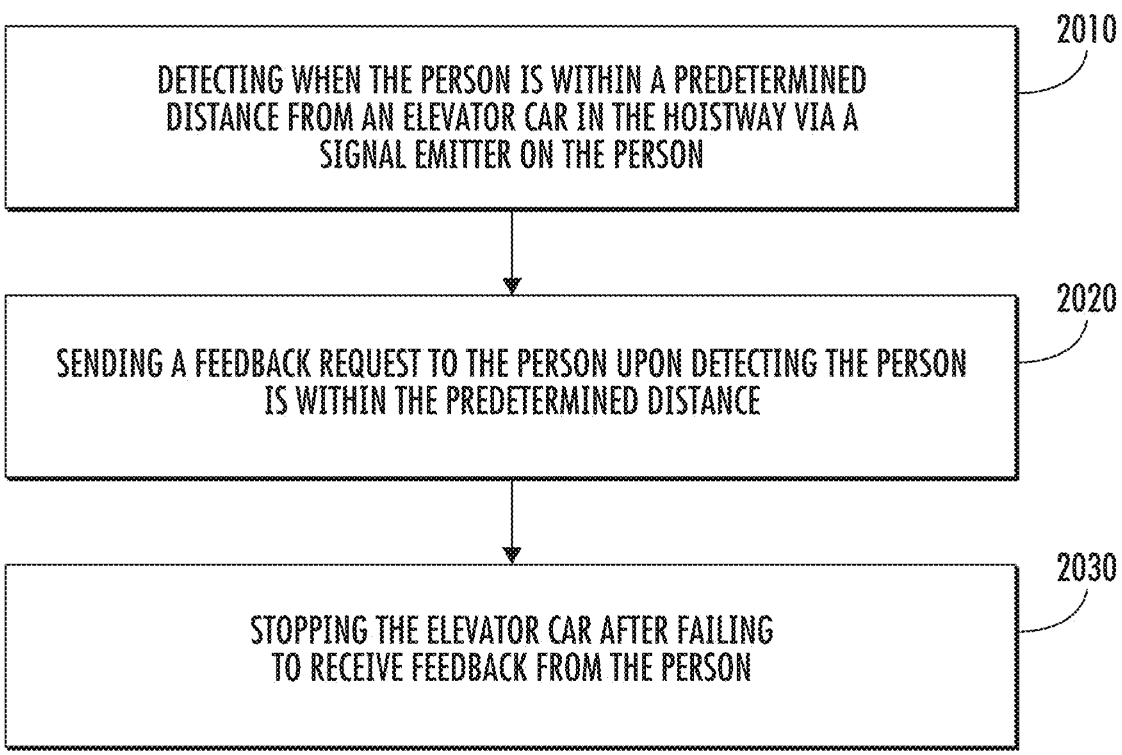
FIG. 2C is a flowchart showing a system for detecting a mechanic in an elevator hoistway.

That is, as shown in FIG. 2C, a method of detecting a location of a mechanic 210 includes, at block 2010, detecting when the mechanic 210 is within a predetermined distance from an elevator car 103 in the hoistway 117 via a signal emitter on the mechanic 210. At block 2020, the method includes sending a feedback request to the mechanic 210 upon detecting the mechanic is within the predetermined distance. At block 2030, the method includes stopping the elevator car 103 after failing to receive feedback responsive to the feedback request from the mechanic 210.

Figure 2D:
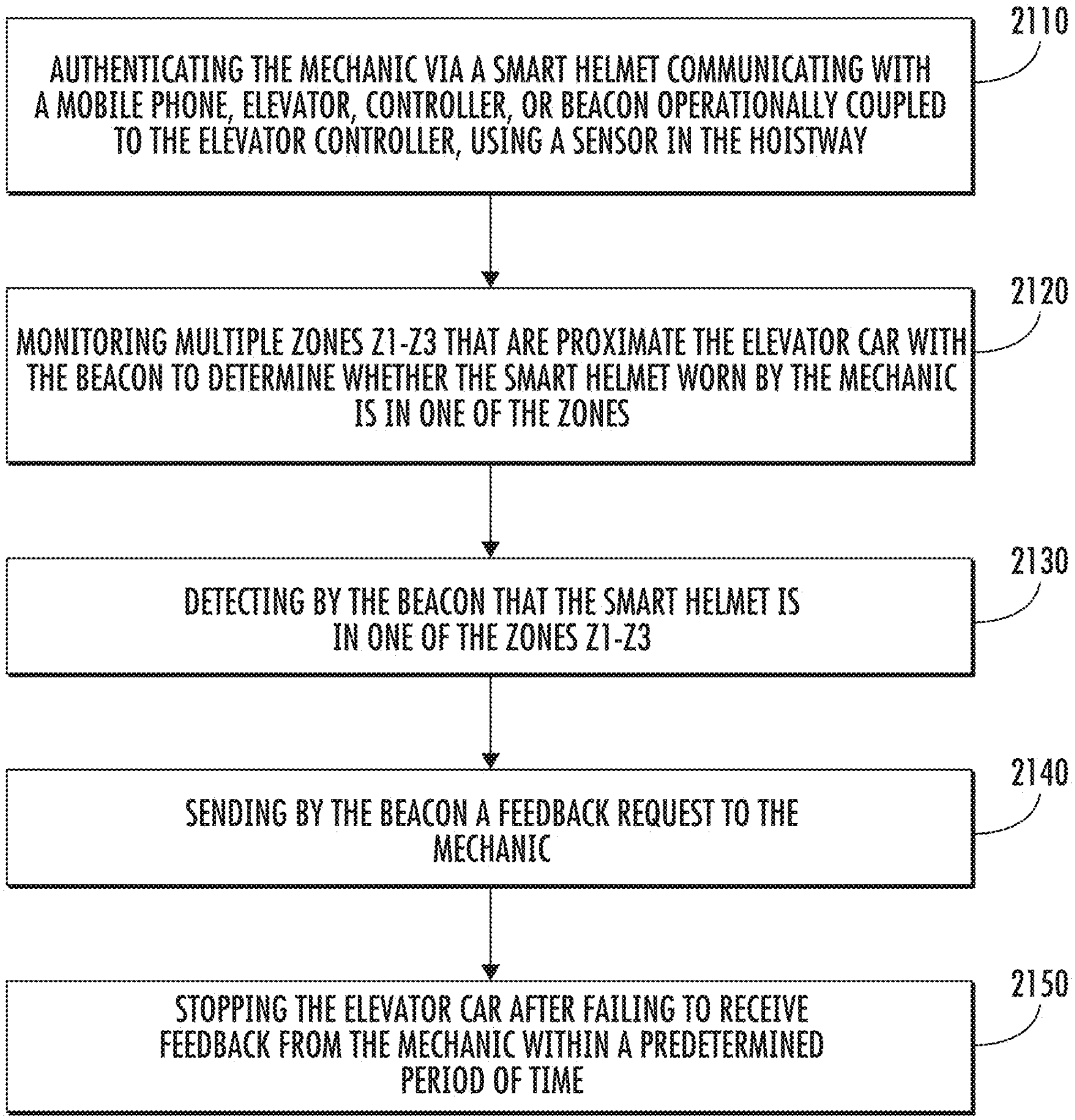
FIG. 2D is another flowchart showing a system for detecting a mechanic in an elevator hoistway.

More specifically, as shown in FIG. 2D, the method includes, at block 2110, authenticating the mechanic 210 via a smart helmet 220 communicating with a mobile phone 250, elevator controller 115, or beacon 260 operationally coupled to the controller 115, using a sensor 230 in the hoistway 117 for the authentication. As shown in block 2120, the method includes monitoring multiple zones Z1-Z3 that are proximate the elevator car 103 with the beacon 260 to determine whether the smart helmet 220 worn by the mechanic 210, and thus the mechanic 210, is in one of the zones. As shown in block 2130, the method includes detecting by the beacon 260 that the smart helmet 220 is in one of the zones Z1-Z3. As shown in block 2140 the method includes sending via the beacon 260 a feedback request to the mechanic 210. As shown in block 2150, the method includes stopping the elevator car 103 after failing to receive feedback from the mechanic 210 within a predetermined period of time. Regarding benefits of the embodiments, these benefits include an improved mechanic safety, the ability to analyze a mechanics behavior while servicing, the ability to avoid hoistway accidents, and reduce complexity involved with maintenance.

Figure 3:
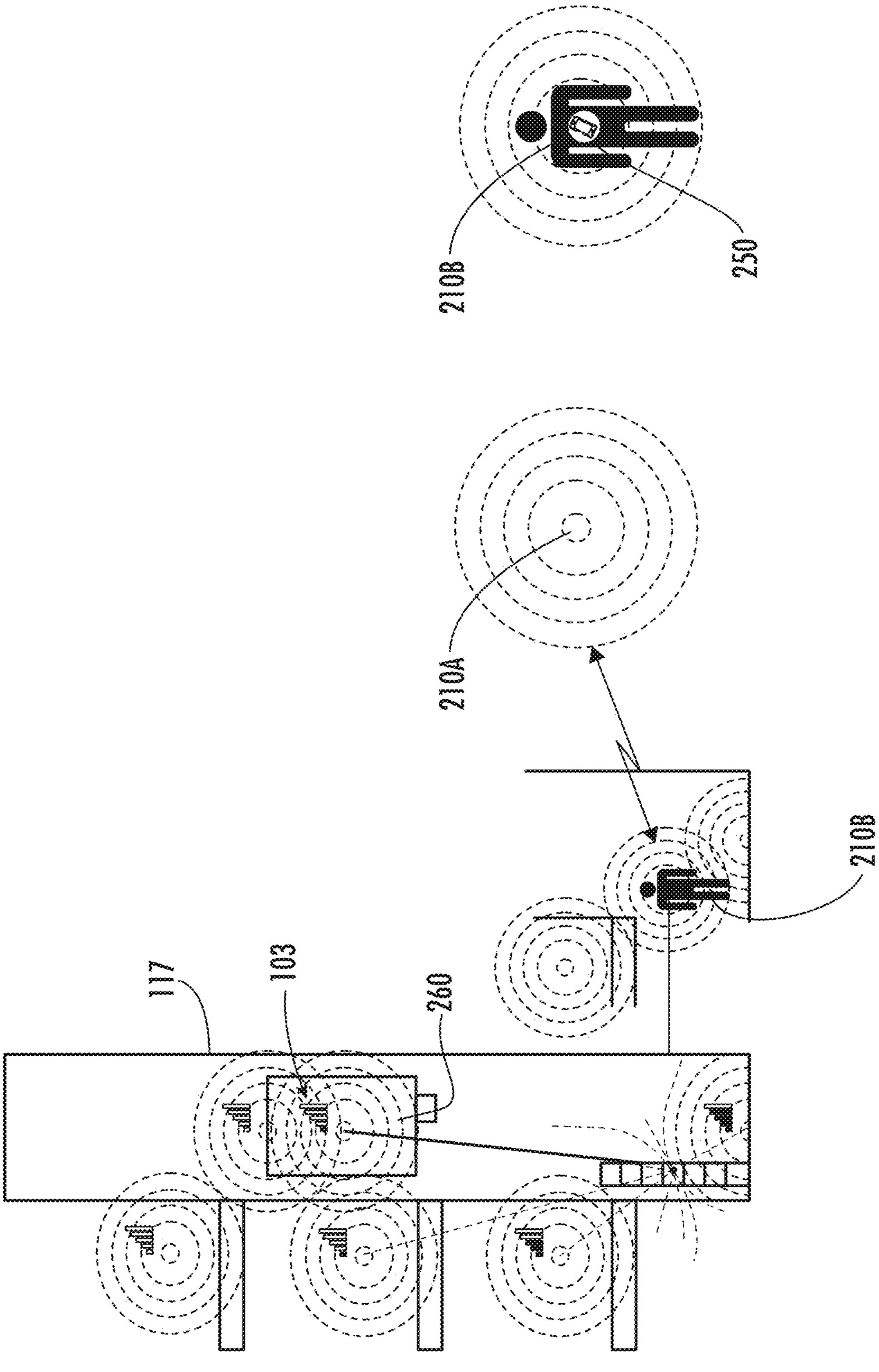
FIG. 3 shows a signal strength interaction between a signal emitter on a mechanic and receivers in a hoistway and an elevator car to identify a location of the mechanic.

Turning to FIG. 3, according to embodiments, transmittance levels between an emitter and a receiver determine a distance between a mechanic 210 with a transmitter (or emitter) and the detector (or receiver) that permit the geolocation of the mechanic 210 by triangulation, e.g., utilizing real time detection. As shown, the receiver device 260 for a real time detection system utilizes different frequencies for multiple mechanics 210A/210B. Emitters for the different mechanics may be within the smart helmet disclosed above or worn otherwise on the mechanics 210A/210B, or can be incorporated in a mobile phone 250 with an application or another dedicated device. The mobile phone 250 or device may be considered a PPE (mechanical protection equipment). The mobile device 250 may be included in the work clothes. Several pieces of equipment may be used, e.g., the mobile phone 250 with another device, to improve location. FIG. 3 shows signal strength interaction between an emitter on two mechanics 210A/210B, the receiver 260 in a hoistway 117 and the elevator car 103 to identify a location of the mechanic 210. The higher the signal strength level, closer the mechanic 210 is to the receiver, such as the beacon 260 disclosed above, as programed by the system. If the mechanic 210 is too close, the system determines, for example, that the elevator car 103 may injure the mechanic 210 by hitting them, e.g., in the hoistway pit, and actions may be automatically taken to avoid this outcome. Benefits of the embodiments include, e.g., protecting mechanics during installation, repair and maintenance of an elevator system.

Figure 4:
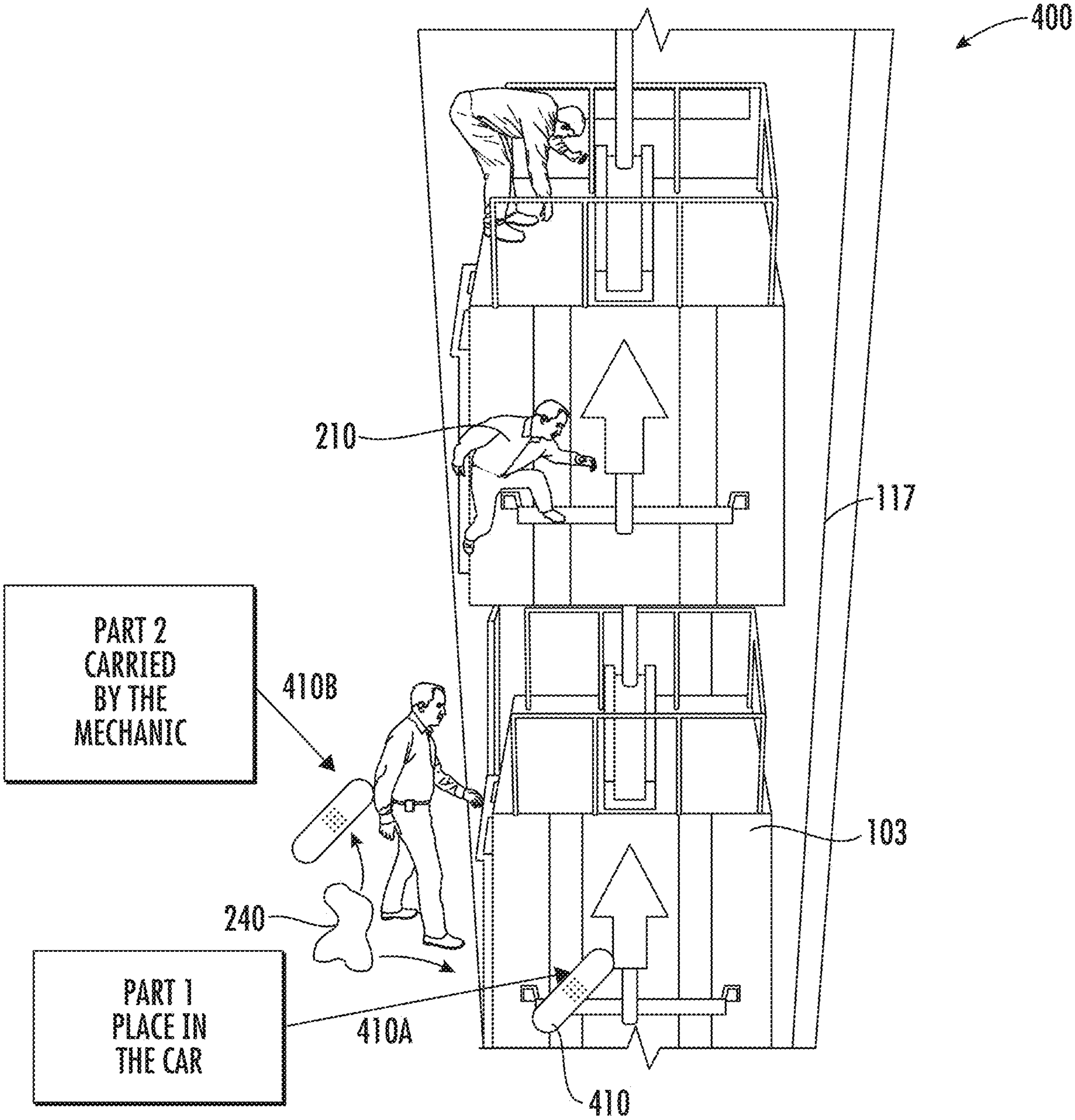
FIG. 4 shows components of a system for detecting a location of a mechanic, according to another embodiment.

FIG. 4 shows components of a system 400 for detecting a location of a mechanic according to another embodiment. The embodiment shown in FIG. 4 relates to a wireless buzzer alarm device 410. Accidents may occur when the car 103 moves from rest to motion. In view of this concern, disclosed is a wireless buzzer alarm device 410 that contains two parts. One part 410A includes speed detection sensor which is placed in the elevator car 103. It detects the car 103 movement and delivers a signal. Another part 410B includes a buzzer device 410 is carried by the mechanic 210. It receives the signal from the first part 410A and makes a buzzer sound noise when the elevator car 103 transitions from stationary to moving to warn the mechanic 210 to keep away from the car 103. Both parts are operatively connected to each other by a wireless network 240 such as via Bluetooth or WIFI signals. As indicated, accidents may occur when the car moves from rest to motion. The buzzer noise warning can help avoiding the mistake entering.

Reference herein to different systems, such as 101, 200 and 400, may differ from each only to the extent discussed. Alternatively, aspects may be combined to provide for extra assurances of detecting a mechanic in a hoistway.

Figure 5:
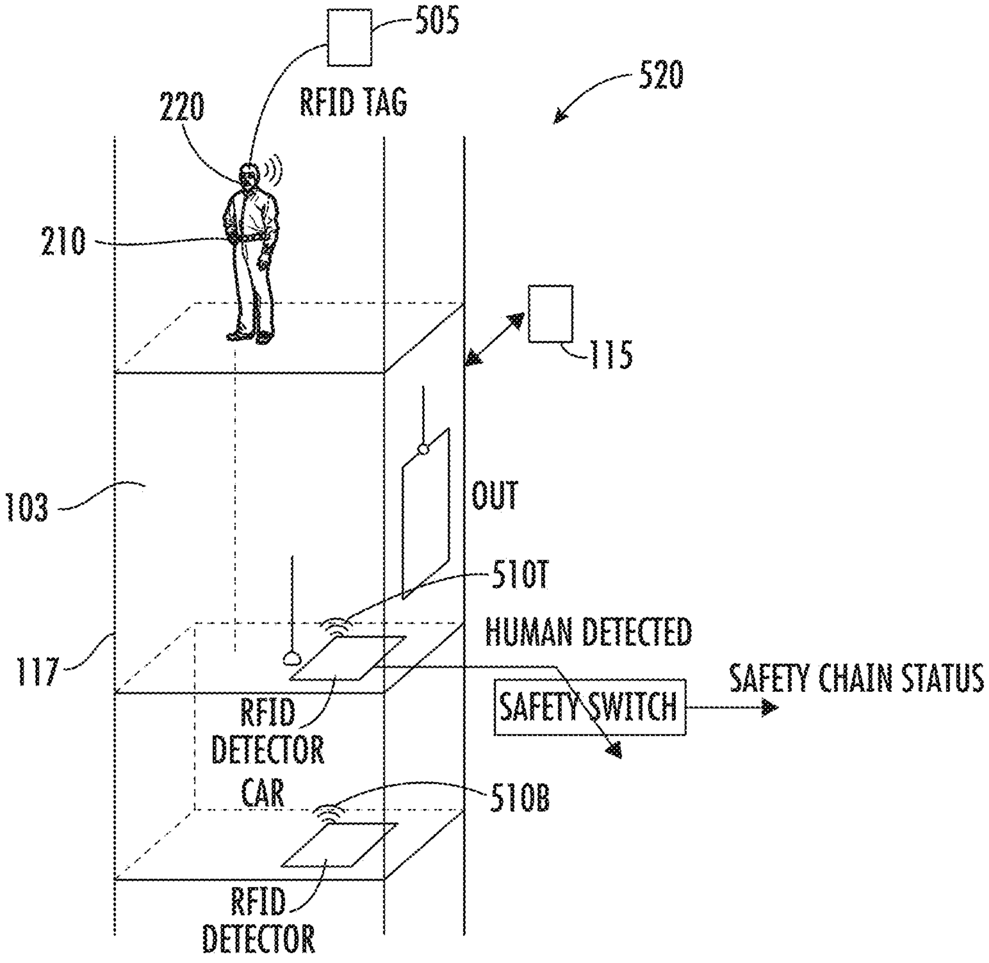
FIG. 5 shows the use of RFID technology to track a mechanic according to another embodiment.

The embodiments of the system 500 illustrated in FIG. 5 are also directed to automatically detect an unexpected mechanic 210 present in a hoistway 117 during elevator car 103 operation, and then to stop car 103 motion for safety. The embodiments herein are further directed to RFID tags 505 on the hard hat/helmet 220 and real-time anomaly detection in a hoistway 117 image. RFID tags 505 on a hard hat 220 can be used to track the location of a mechanic 210. RFID detectors/readers 510T/510B can be installed above and below the car 103 body. The output signals from detectors 510T/510B can be integrated to elevator system 500, e.g., and may be operationally coupled to the controller 115. If the mechanics 210 are within the operation zone in the hoistway 117 unexpectedly, the detectors 510T/510B can trigger an elevator safety system and disable car 103 motion.

Turning to FIGS. 6A-6D, regarding real-time anomaly detection in a hoistway 117 image, cameras 530 in a hoistway 117 can be used to capture offline hoistway images with or without a mechanic's presence. The images can be used by machine learning tools for training (e.g. deep learning) to classify different categories. Then the trained tools may be used to process real time images captured by hoistway cameras 530. Once an image with an unexpected mechanic's presence is captured, the trained tool may identify it and trigger the safety chain for the elevator car 103.

Figure 6A:
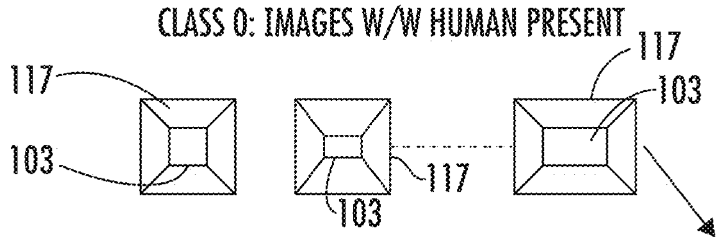
FIG. 6A shows a graphical image of a system space without the presence of a mechanic, according to another embodiment.
Figure 6B:
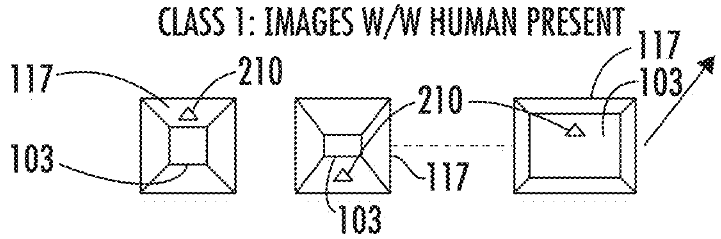
FIG. 6B shows a graphical image of the system space with the presence of a mechanic.
Figure 6C:
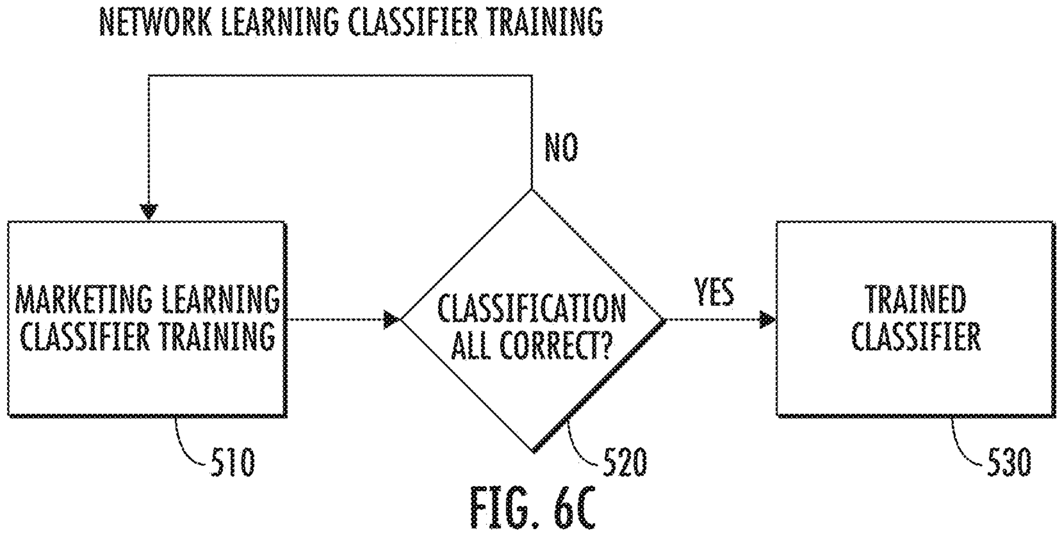
FIG. 6C shows a flowchart of training a classification system to identify when a mechanic is present in the system space.
Figure 6D:
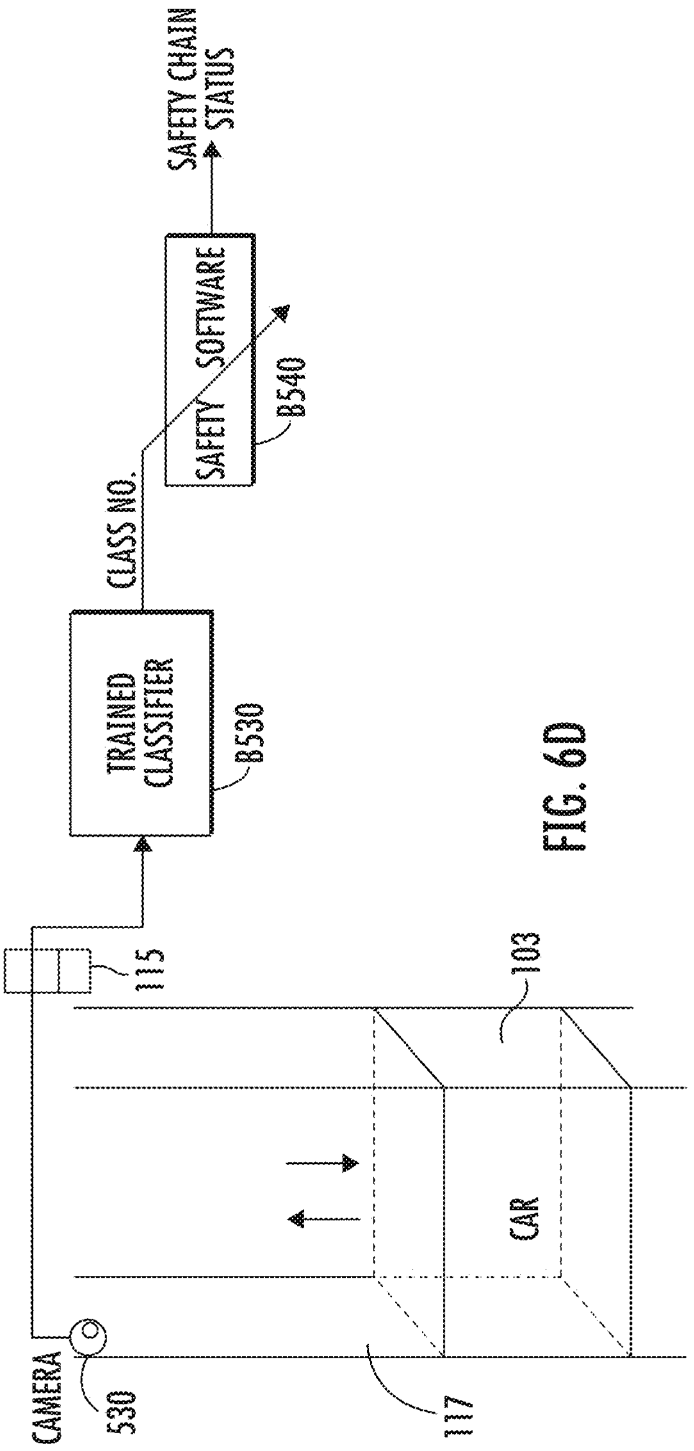
FIG. 6D shows the system utilizing a sensor in a hoistway to apply trained classification logic to identify whether a mechanic is present.

For example, FIG. 6A shows a graphical image of a system space, e.g., a hoistway 117 and a car 103 in the hoistway 117, without the presence of a mechanic 210. FIG. 6B shows a graphical image of the system space with the presence of a mechanic 210. FIG. 6C shows a flowchart of method of training a classification system to identify when a mechanic is present in the system space. According to the method as shown in block 510, the system 500, via the car controller 115 or elevator system controller 290, is set to a training mode. At block 520 the system makes a determination of whether a mechanic 210 is in the system space. If the system is wrong (no at 520) then the system continues with additional training (block 510). If the system is correct (yes at 520) then as shown in block 530, a determination is made by the system that the system is trained. FIG. 6D shows the system utilizing a sensor 530 in a hoistway 117 to apply the trained classification logic to identify whether the mechanic 210 is present. The sensor 530, via edge computing or via communicating with the elevator controller 115, determines that it has been trained at block B530 and makes a determination at block B540 that the conditions are safe because no mechanic 210 is present. Thus the embodiments include training the one or more processors, e.g., the sensors, the elevator controller, etc., to learn via machine learning to determine when a mechanic 210 is within the hoistway 117 based on sensor collected data (e.g., the collected graphical images). The embodiments add an extra layer for human detection during elevator operation.

Turning to FIGS. 7A-7F, another system is directed to a mechanic 210 position detection system in a hoistway. A mechanic 210 may contact the car 103, hoistway 117, counterweight 105, etc. during service when the car 103 is operating in a normal mode or an inspection mode, which may lead to injury. The embodiments detect the potential incident and prevent before incidents happen with the use of a smart key 700 (transmitter, such as a key-fob). Generally, the range of radio waves used by smart keys is about 0.7 to 1 meter in radius. The system can identify a mechanic's position, when he or she is in the elevator car 103, on the car 103, or in the pit 270. By identifying the signal from the device smart key 700 by the processor such as the elevator car controller 115, various advantages can be obtained. The mechanic 210 can put the elevator car 103 under their control upon entering the hoistway 117. The elevator controller 115 can automatically identify when there are mechanics 210 in the hoistway 117. As shown in the figures, the embodiments place sensors 710 at the top of the hoistway 117, the elevator car 103, within the elevator car 103, below the elevator car 103 and within the pit 270, which would be in range of a key 700 held by the mechanic 210 when he is in close proximity.

Figures 7A, 7B, 7C:
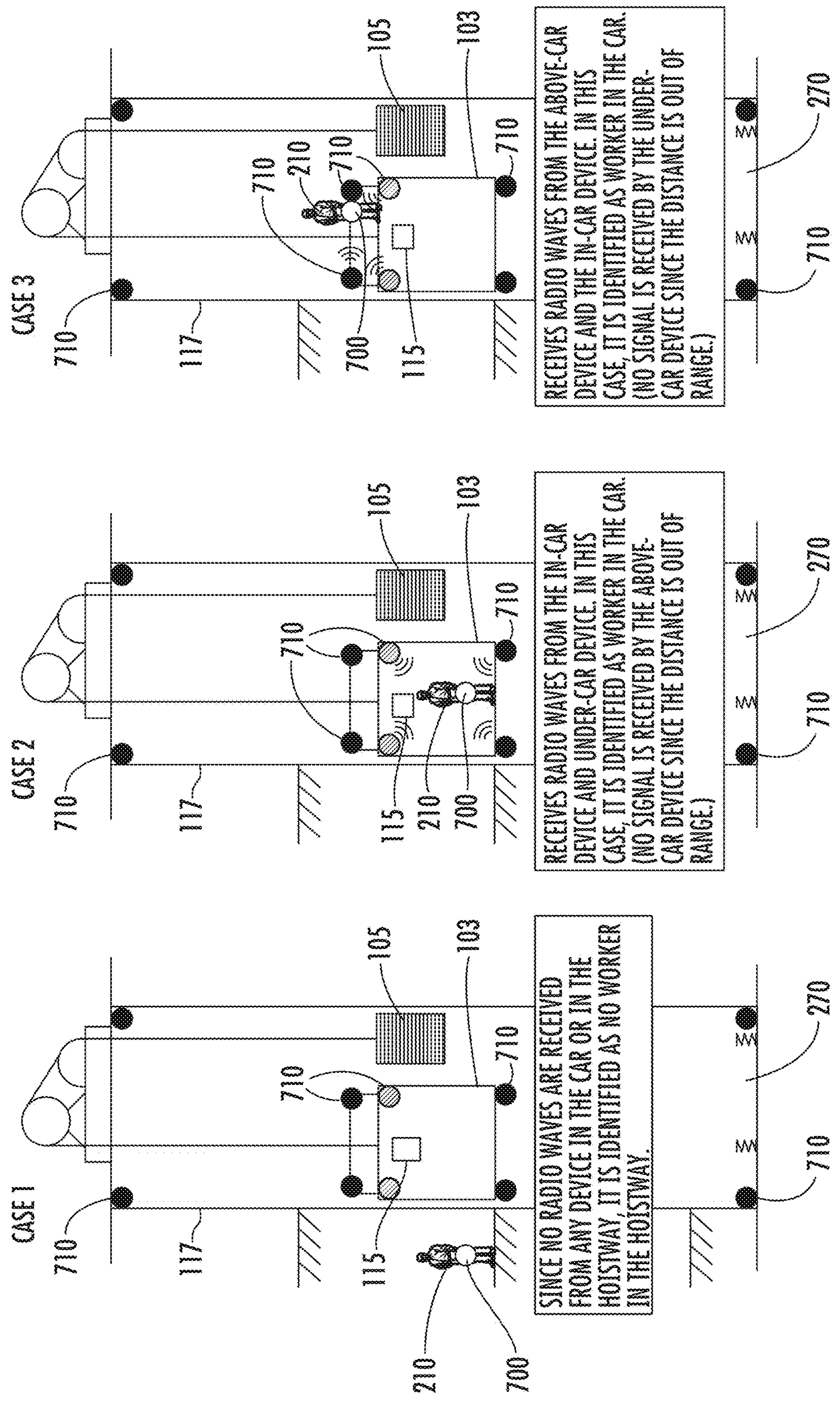
FIG. 7A shows a configuration in which no radio waves are detected in the hoistway above or below the car, immediately above the car or below the car, or in the car, to determine that no mechanic is in the hoistway or car, according to another embodiment.
FIG. 7B shows a configuration in which radio waves are detected in the car and immediately under the car, but not immediately above the car, or in the hoistway above or below the car, to determine that the mechanic is in the car and no mechanic is in the hoistway.
FIG. 7C shows a configuration in which radio waves are detected in the car and immediately above the car, but not immediately below the car or in the hoistway above or below the car, to determine that the mechanic is above the car.

Specifically, turning to the figures, FIG. 7A shows a configuration in which no radio waves are detected in the hoistway 117 above or below the car 103, immediately/directly above the car 103 or below the car 103 (e.g., spaced from the car in the hoistway 117), or in the car 103, to determine that no mechanic is in the hoistway or car. That is, since no radio waves are received from a smart key in the car or in the hoistway, there is a determination that no mechanic 210 is in the hoistway 117. FIG. 7B shows a configuration in which radio waves are detected in the car 103 and immediately/directly under the car 103, but not immediately/directly above the car 103, or in the hoistway 117 above or below the car 103, to determine that the mechanic 210 is in the car 103 and no mechanic 210 is in the hoistway 117. That is, radio waves are received within the car 103 and directly under the car 103. From this, the elevator controller 115 determines the mechanic 210 is in the car 103. No signal is received directly above the car 103 because the relatively short travel waves emitted from the smart key are out of range.

Figure 7D:
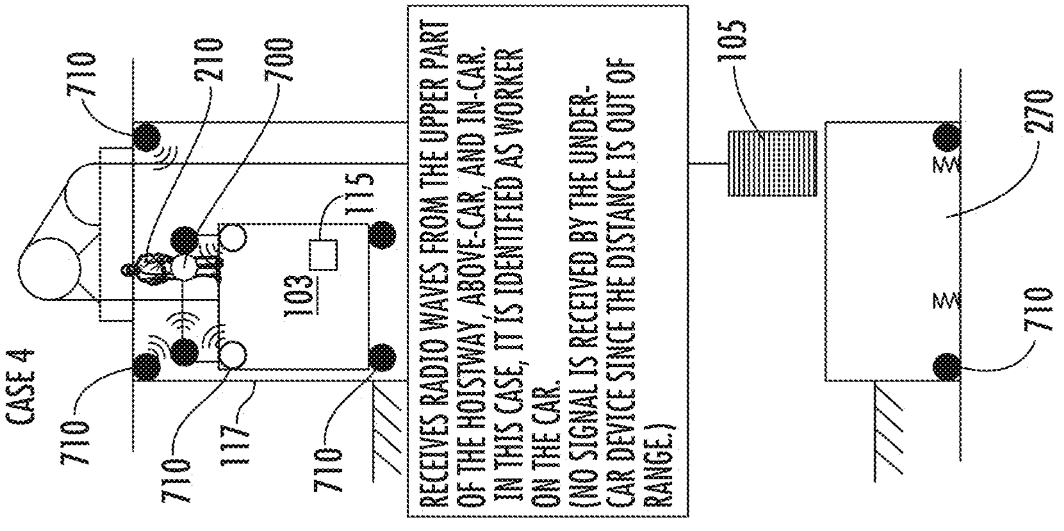
FIG. 7D shows a configuration in which radio waves are detected in the car and immediately above the car, and in the hoistway above the car, but not immediately below the car or in the hoistway below the car, to determine that the mechanic is above the car, where the controller is programmed to conclude that the mechanic at the top of the hoistway, above the car, would be supported by the car.

FIG. 7C shows a configuration in which radio waves are detected in the car 103 and immediately/directly above the car 103, but not immediately/directly below the car or in the hoistway 117 above or below the car 103, to determine that the mechanic 210 is above the car 103. That is, radio waves are received above the car 103 and in the car 103. From this, the elevator controller 115 determines the mechanic 210 is above the car 103. No signal is received directly under the car 103 because the relatively short travel waves emitted from the smart key are out of range. FIG. 7D shows a configuration in which radio waves are detected in the car 103 and immediately/directly above the car 103, and in the hoistway 117 above the car 103, but not immediately/directly below the car 103 or in the hoistway 117 below the car 103, to determine that the mechanic 210 is above the car 103. The logic in the controller 115 is programed to conclude that the mechanic 210 at the top of the hoistway 117, above the car 103, is supported by the car 103. That is, radio waves from the key 700 are received by sensors 710 at the upper part of the hoistway 117 and above the car 103 and in the car 103 but not directly below the car 103 because the relatively short travel waves emitted from the smart key are out of range.

Figure 7E:
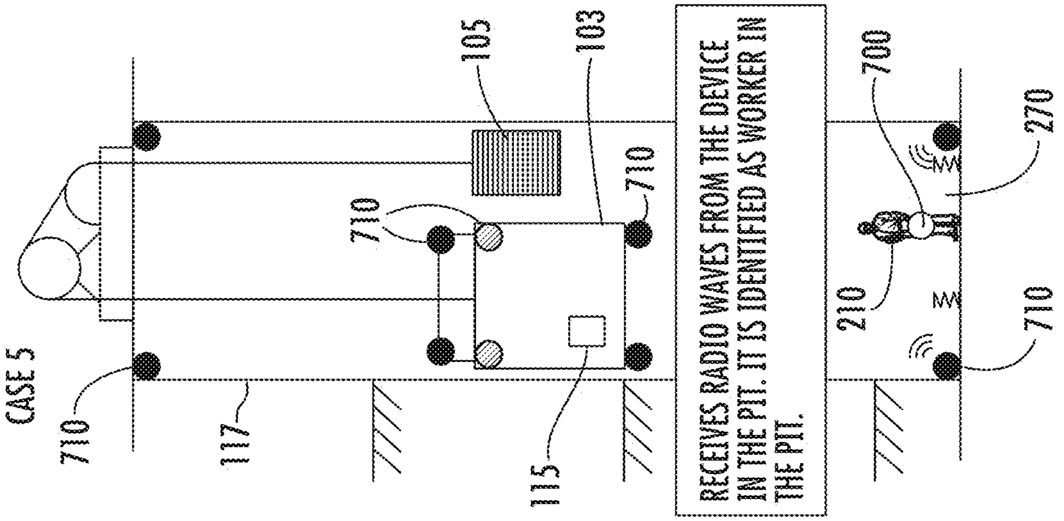
FIG. 7E shows a configuration in which radio waves are detected in the hoistway below the car, but not in the car, or immediately above or below the car, or in the hoistway above the car, to determine that the mechanic is in the hoistway pit.
Figure 7F:
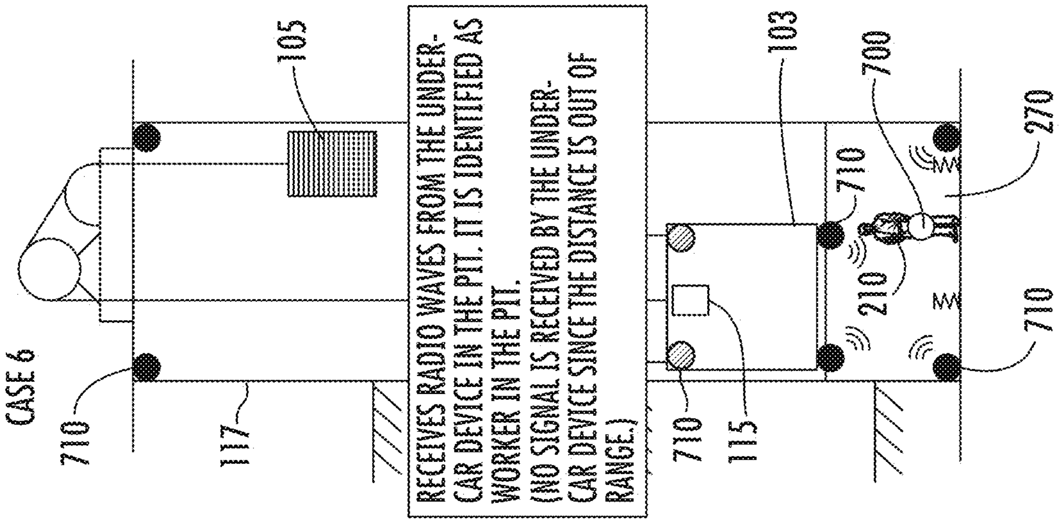
FIG. 7F shows a configuration in which radio waves are detected in the hoistway below the car and immediately below the car, but not in the car, or immediately above the car, or in the hoistway above the car, to determine that the mechanic is in the hoistway pit, where the controller is programmed to conclude that the mechanic is in the hoistway, below the car and at the pit, and is supported by the pit.

FIG. 7E shows a configuration in which radio waves are detected in the hoistway 117 below the car 103, but not in the car 103, or immediately/directly above or below the car 103, or in the hoistway 117 above the car 103, to determine by the elevator controller 115 that the mechanic 210 is in the hoistway pit 270. That is, the radio waves from the smart key 700 are only received in the pit 270 as all other receivers 710 are out of range. FIG. 7F shows a configuration in which radio waves are detected in the hoistway 117 below the car 103 and immediately/directly below the car 103, but not in the car 103, and immediately/directly above the car 103, or in the hoistway 117 above the car 103, to determine by the elevator controller 115 that the mechanic 210 is in the hoistway pit 270. That is, the controller 115 is programed to conclude that the mechanic 210 may be supported by the pit 270. Specifically, radio waves from the smart key 700 are received immediately/directly below the elevator car and in the pit. No signal is received in the car since the radio waves from the smart key 700 are only received in the pit 270 as all other receivers 710 are out of range.

Thus, the embodiments of FIG. 7A-7F include communicating by the one or more controllers, such as the car controller 115, with the one or more sensors 710 to determine whether the one or more sensors 710 detects a signal from the signal emitter 700 to thereby determine the mechanic 210 is within the hoistway 117 or elevator car 103. The one or more sensors 710 are located at a top of the hoistway 117, in the hoistway pit 270, directly above the elevator car 103, directly below the elevator car 103, and within the elevator car 103. The signal emitter 700 according to the embodiments is a smart key.

Figure 8A:
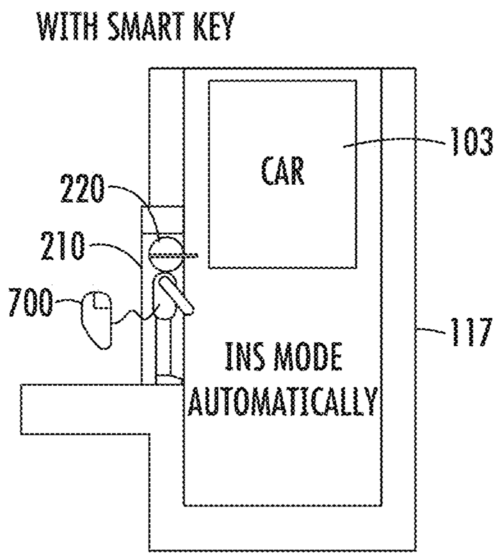
FIG. 8A shows a person with an electronic key entering the hoistway.
Figure 8B:
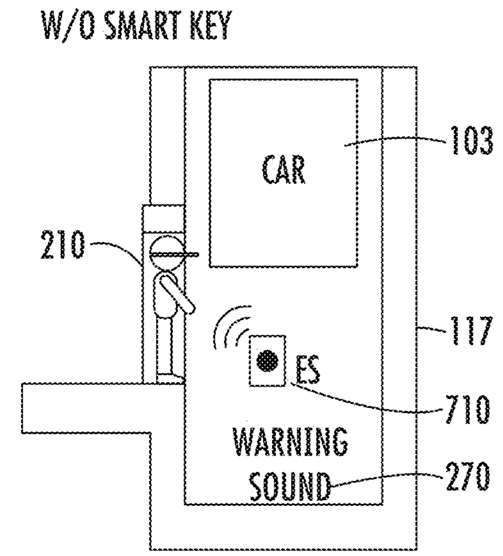
FIG. 8B shows a person without an electronic key entering the hoistway.

In accordance with a further embodiment, a maintenance person 210 may be required to carry a smart key when entering a hoistway 117. When the maintenance person 210 enters the hoistway 117, the electronic receiver/detector 710 of the smart key 700 in the hoistway 117 and or pit 270 may automatically switch to the INS (inspection) mode. If the maintained person 210 enters the hoistway 117 while not being in possession of the smart key 700, e.g., and a position detector 710 detects a person in the hoistway 117 (FIG. 8B), a warning alarm will sound until the maintenance person 210 enters an "ES-OFF" and an "INS-ON" operation. The smart key 700 may be connected to a helmet 220 of the maintenance person 210.

In the above paragraph, "ES-OFF" means emergency stop switch off. This emergency switch has two modes, on and off. When the emergency switch is off, the elevator cannot move. "INS-ON" means inspection mode switch on. This inspection mode switch also has two modes, on and off. When this switch is on, elevator cannot operate normal mode. Near the inspection mode switch, there is an up, down and common switch. The elevator can only move with these switches handling by mechanics, that is, the elevator is fully under the control of the mechanic. There is an emergency switch and an inspection mode switch on top of the car, and the normal operation for entering into a hoistway and riding on the top of car, at first open the entrance door and engage the emergency switch. Then turn the emergency switch "off" and turn the inspection mode switch "on" by manual operation. Then the mechanic can go into hoistway and stand on the top of car. The ES is also available in the pit, but an inspection mode switch is not typically in the pit. As these switch operations are manually performed by mechanics, accidents may happen. If these switch operations are controlled by a detecting device per the disclosed embodiments, the accidents may be eliminated.

In the above embodiments, sensor data may be obtained and processed separately, or simultaneously and stitched together, or a combination thereof, and may be processed in a raw or complied form. The sensor data may be processed on the sensor (e.g. via edge computing), by controllers identified or implicated herein, on a cloud service, or by a combination of one or more of these computing systems.

The senor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. The Internet of things (IoT) describes the network of physical objects—"things"—that are embedded with sensors, software, and other technologies for the purpose of connecting and exchanging data with other devices and systems over the Internet. Other LPWAN-IOT technologies include narrowband internet of things (NB-IOT) and Category M1 internet of things (Cat M1 IOT. Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium.

The controller may further include, in addition to a processor and non-volatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection identified herein with other processors.

Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for detecting a presence of a person in a hoistway, comprising:

one or more controllers configured to authenticate the person in the hoistway via a signal emitter, that is a smart helmet, wherein the smart helmet is configured to be worn by the person, and to automatically enter an inspection mode upon authentication, wherein upon entering, and while in, the inspection mode, the one or more controllers is configured to lock the signal emitter to the person, to thereby effect communications with the signal emitter utilizing a uniquely assigned signal;

the one or more controllers being operationally connected to an elevator car in the hoistway and configured to determine whether the person is within a predetermined distance of the elevator car from a signal emitter on the person, wherein the predetermined distance is implemented by signal-strength thresholds, measured by the one or more controllers via a signal strength from the signal emitter to a beacon connected to the elevator car, corresponding to a plurality of zones of radiation, including a caution zone, a warning zone, and a danger zone, relative to the elevator car;

wherein when the person is within the predetermined distance of the elevator car, the one or more controllers is configured;

to transmit a feedback request to the smart helmet and stop the elevator car unless the one or more controllers receives feedback to the feedback request within a predetermined period of time, and to issue an emergency stop button command to the elevator car upon the elevator car entering the danger zone without receiving the feedback within the predetermined period of time.

2. The system of claim 1, wherein the one or more controllers is configured to transmit to a mobile phone of the person the feedback request.

3. The system of claim 2, wherein the one or more controllers includes:

an elevator controller that controls directional motion of the elevator car; and the beacon connected to the elevator car that is configured to communicate with the smart helmet to determine a proximity of the smart helmet to the elevator car, and to communicate with the mobile phone of the person to transmit the feedback request.

4. The system of claim 3, wherein the smart helmet is configured to communicate with the beacon utilizing Bluetooth Low Energy.

5. The system of claim 1, comprising:

a first transmitter that is located on the elevator car;

a second transmitter that is configured to be worn by a person;

wherein the first and second transmitters are operatively coupled over a wireless communication path;

wherein the first transmitter is configured to determine when a velocity or acceleration change occurs in the elevator car and transmit a signal indicative of the velocity or acceleration change to the second transmitter; and the second transmitter is configured to provide a warning to the person when the velocity or acceleration change is greater than a threshold.

6. The system of claim 1, comprising a plurality of signal detectors located in one or more of the hoistway and the elevator car and are operatively coupled to the one or more controllers, whereby the one or more controllers are configured to determine that the person is located within the elevator car, above the elevator car, or in a hoistway pit.

7. The system of claim 1, comprising signal detectors at a top of the hoistway, directly above the elevator car, within the elevator car, directly below the elevator car, and within a hoistway pit, wherein utilizing a signal strength from the signal emitter, received by the signal detectors, the one or more controllers is configured to determine that the person is located within the elevator car, above the elevator car, or in the hoistway pit.

8. The system of claim 1, wherein the one or more controllers configured to authenticate the person in the hoistway via the signal emitter, that is the smart helmet, over a low-energy personal area network (PAN).

9. The system of claim 1, wherein the communications include voice communications for reproduction via a built-in speaker of the signal emitter.

10. A method of detecting a presence of a person in a hoistway, comprising:

authenticating, by one or more controllers, the person via a smart helmet having a signal emitter, wherein the smart helmet is configured to be worn by the person;

automatically entering an inspection mode upon authentication, wherein upon entering, and while in, the inspection mode, the one or more controllers locks the signal emitter to the person, and assign a unique signal to the signal emitter;

detecting, by the one or more controllers, when the person is within a predetermined distance from an elevator car in the hoistway via the signal emitter worn by the person, wherein the predetermined distance is implemented by signal-strength thresholds, measured via the one or more controllers via a signal strength from the signal emitter to a beacon connected to the elevator car, corresponding to a plurality of zones of radiation, including a caution zone, a warning zone, and a danger zone, relative to the elevator car;

sending, by one or more controllers, a feedback request to the smart helmet upon detecting the person is within the predetermined distance; and stopping the elevator car, by one or more controllers issuing an emergency stop bottom comment to the elevator car, upon the elevator car entering the danger zone, after failing to receive feedback within a predetermined period of time.

11. The method of claim 10, comprising sending the feedback request to a mobile phone of the person.

12. The method of claim 11, wherein the smart helmet transmits signals utilizing Bluetooth Low Energy.

13. The method of claim 12, wherein one or more controllers is connected to the elevator car that communicates with the smart helmet utilizing Bluetooth Low Energy.

14. The method of claim 13, comprising training the one or more controllers to learn via machine learning to determine when the person is within the hoistway.

15. The method of claim 13, comprising communicating by the one or more controllers with one or more sensors to determine whether the one or more signal detectors detects a signal from the signal emitter, to thereby determine the person is within the hoistway or the elevator car.

16. The method of claim 13, wherein signal detectors are located at a top of the hoistway, in a hoistway pit, directly above the elevator car, directly below the elevator car, and within the elevator car, and the method includes utilizing a signal strength from the signal emitter, received by the signal detectors, to determine that the person is located within the elevator car, above the elevator car, or in the hoistway pit.

17. The method of claim 16, wherein the signal emitter is a smart key.

18. The method of claim 10, wherein the one or more controllers configured to authenticate the person in the hoistway via the signal emitter, that is the smart helmet, over a low-energy personal area network (PAN).

19. The method of claim 10, wherein the communications include voice communications for reproduction via a built-in speaker of the signal emitter.

* * * * *